Sept. 15, 1936.    B. C. WHITMAN    2,054,401
CONTINUOUS SYNCHRONIZED SILHOUETTE MAT STEP PRINTING
APPARATUS FOR MOTION PICTURE PHOTOGRAPHY
Filed Aug. 6, 1935    5 Sheets-Sheet 1

INVENTOR
Bernard C. Whitman,
BY
Jacobi & Jacobi
ATTORNEYS

INVENTOR
Bernard C. Whitman,
BY
Jacobi & Jacobi
ATTORNEYS

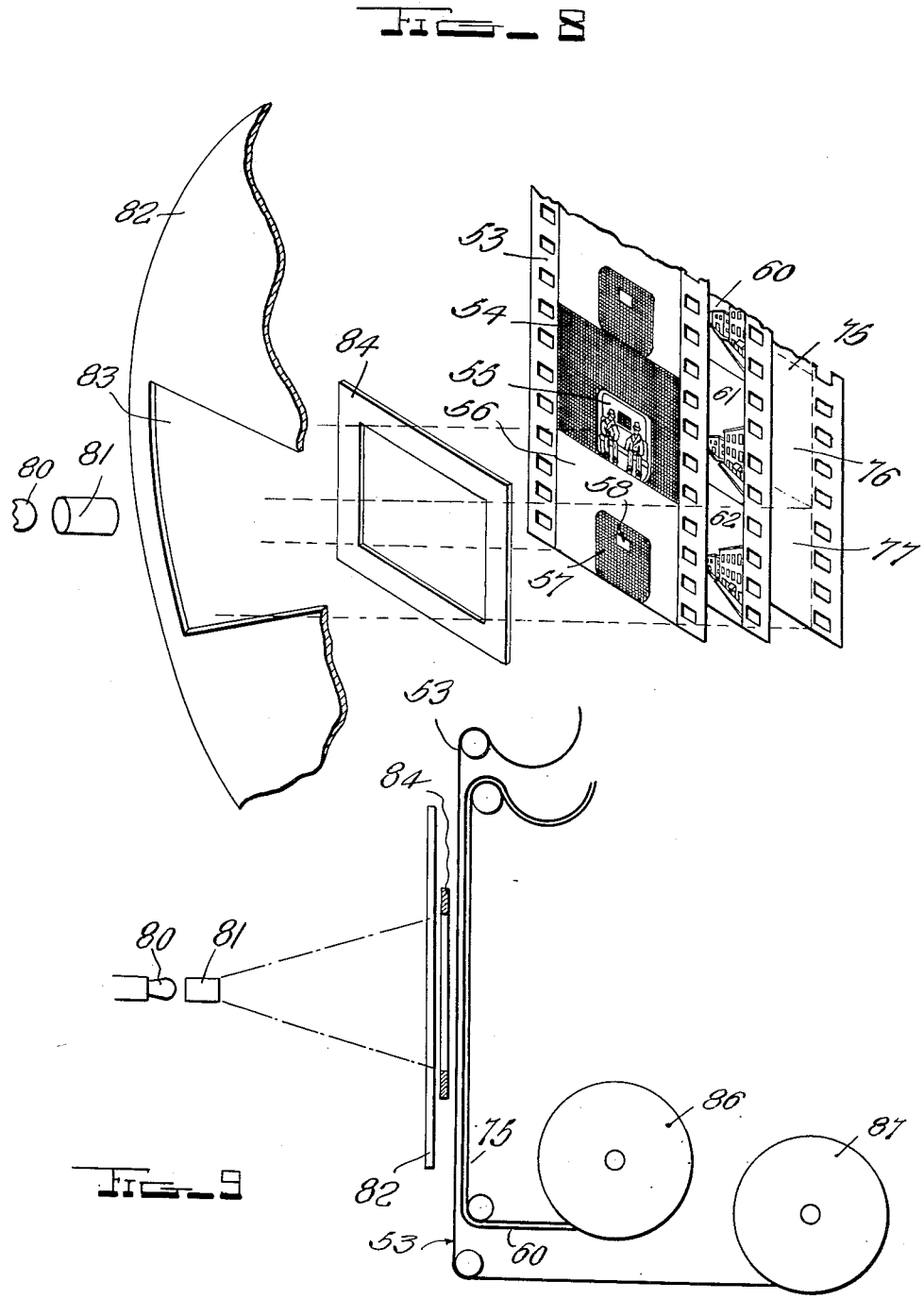

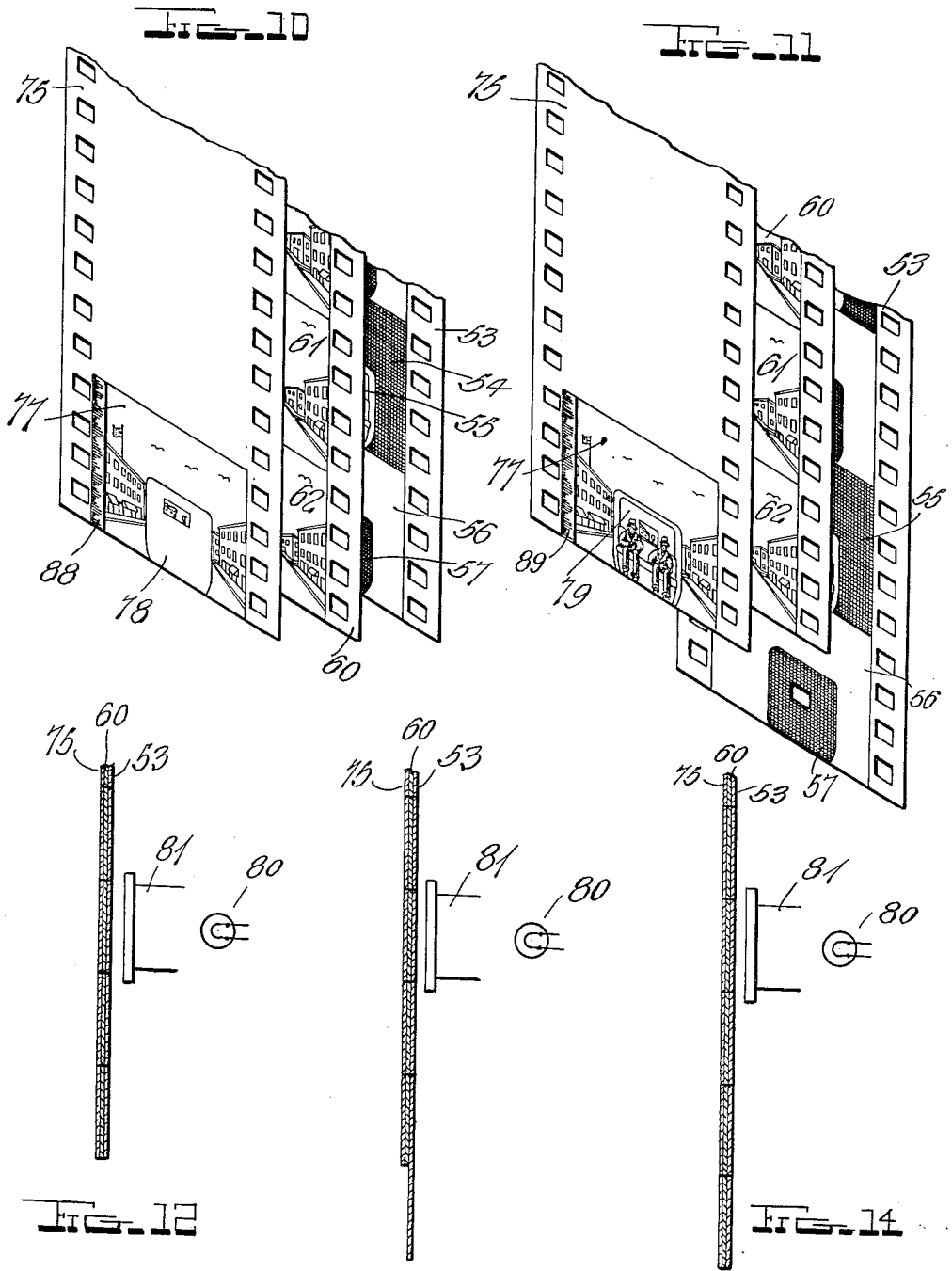

Patented Sept. 15, 1936

2,054,401

UNITED STATES PATENT OFFICE 2,054,401

CONTINUOUS SYNCHRONIZED SILHOUETTE MAT STEP PRINTING APPARATUS FOR MOTION PICTURE PHOTOGRAPHY

Bernard C. Whitman, New York, N. Y.

Application August 6, 1935, Serial No. 34,980

4 Claims. (Cl. 88—16)

My invention relates to the production of motion picture films, and in particular to the production of composite films whereon the visual actions of actors are superposed on any desired recorded elaborate background scene recorded on a film, by step printing of silhouettes.

In the production of motion pictures, it is often desirable to have the actors perform before a familiar or elaborate scenic background, such as a mountain range, a body of water, Fifth Avenue in New York, or an African jungle, which are difficult and expensive of access to the actors performing in other productions at the same time. It is possible to make a large background painting of such background scenes to be mounted in the studio where the actors perform, but this does not give a finished projected scene which is a faithful representation of the original background scene which would be obtained by actually photographing the original.

In my system of making composite motion pictures, an ordinary continuous motion picture film is made of the desired aspects of a background scene. Another film is then made consisting of two separate series of pictures whose frames are alternated, one series showing the visual actions performed in a restricted part of the field of view with usual front lighting in front of a black background, and the other series taken with the same visual actions taken an instant later before a brilliant white background with back lighting to produce silhouettes complementary to the visual actions of the first series. This film as taken is, of course, a negative. A positive of this film with alternated frames is made, and is printed superposed on the ordinary film of the background scene by a system of step printing, a silhouette frame of the alternated film being printed superposed over a frame of the background film, onto undeveloped sensitive film, the alternated film is then advanced one frame to expose a second frame taken with normal lighting on the actors, which second frame is then superposed on the same frame of the background film and on the exposed frame of the undeveloped film, so that the undeveloped film is double exposed. The desired visual actions are thus inset into the background scene. I provide a special type of revolving background apparatus for successively producing a dead black and a brilliant white background, alternating at twice the normal frame rate, which is synchronized with the camera and with the front lighting. I also provide a system wherein sound is recorded coordinated with the visual actions. The silhouette thus constitutes a complementary mat which forms a blank space on the first exposure of the undeveloped composite film, which blank is filled with the visual actions on the second exposure of the undeveloped composite film, and the two blank spaces correspond rigorously in shape because they are taken on the same film only a fraction of a second apart. It is necessary to run the film with alternated frames through the camera only once to get both the silhouette and picture record.

An object of my invention is, therefore, to provide a composite system of motion picture photography wherein visual actions are caused to appear as though taken before a remote background scene.

Another object of my invention is to provide a composite system of motion picture photography wherein a sensitive film is double exposed through a print of the background scene to a silhouette print of visual actions, and through the print of the background scene to a normal print of the visual actions.

A further object of my invention is to provide a special type of movable controllably variably illuminated background which is controlled synchronously coordinated with the camera and front lighting, and in which the background is alternately brilliant white and dead black, the alternations occurring at a rate of about 180 times a minute.

A still further object of my invention resides in providing a device which is simple and durable in construction, inexpensive to manufacture and one which will be very efficient in operation.

With these and numerous other objects in view, my invention consists in the novel features of construction, combination and arrangement of parts as will be hereinafter referred to and more particularly pointed out in the specification and claims.

In the accompanying drawings forming a part of this application:

Figure 8 is a perspective view of the arrangement of the elements of the step printing apparatus, with parts separated and in juxtaposition;

Figure 9 is a side view of the step printing apparatus and films;

Figure 10 shows the first position of two superposed positive prints arranged for blanking the silhouette into the background scene on the undeveloped negative film;

Figure 11 shows the second position of the two superposed positive prints with the picture frame of the alternated film pulled down into printing register, to inset the visual actions into the silhouette blank;

Figure 12 is a side view of the composite printing arrangement, showing the undeveloped negative composite film, the positive background film, and the positive alternated silhouette films in the first printing position;

Figure 13 is a side view of the composite printing arrangement, showing the films in the second printing position, the positive alternated silhouette film being pulled down one frame to bring the picture frame on the alternated film into printing position; and Figure 14 is a side view of the composite printing arrangement, in the next advancement of the film feed, with the background and undeveloped films advanced one frame.

It is possible to employ two entirely separate films for the visual actions, one for the silhouette, and the other for the complementary visual action. Such employment of two separate films has the decided disadvantage that in step printing corresponding complementary frames from two such separate positive prints, the two films will ordinarily shrink unevenly and will not be superposed in register when printing, and also the play and vibration of the cameras will in itself cause the two frames on different films to be out of exact complementary register. My particular process of taking the silhouettes and complementary picture frames on the same film has the great advantage of avoiding this difficulty. I obtain a continuous registration of silhouettes and the complementary pictures which the other processes can not obtain.

Figure 1:
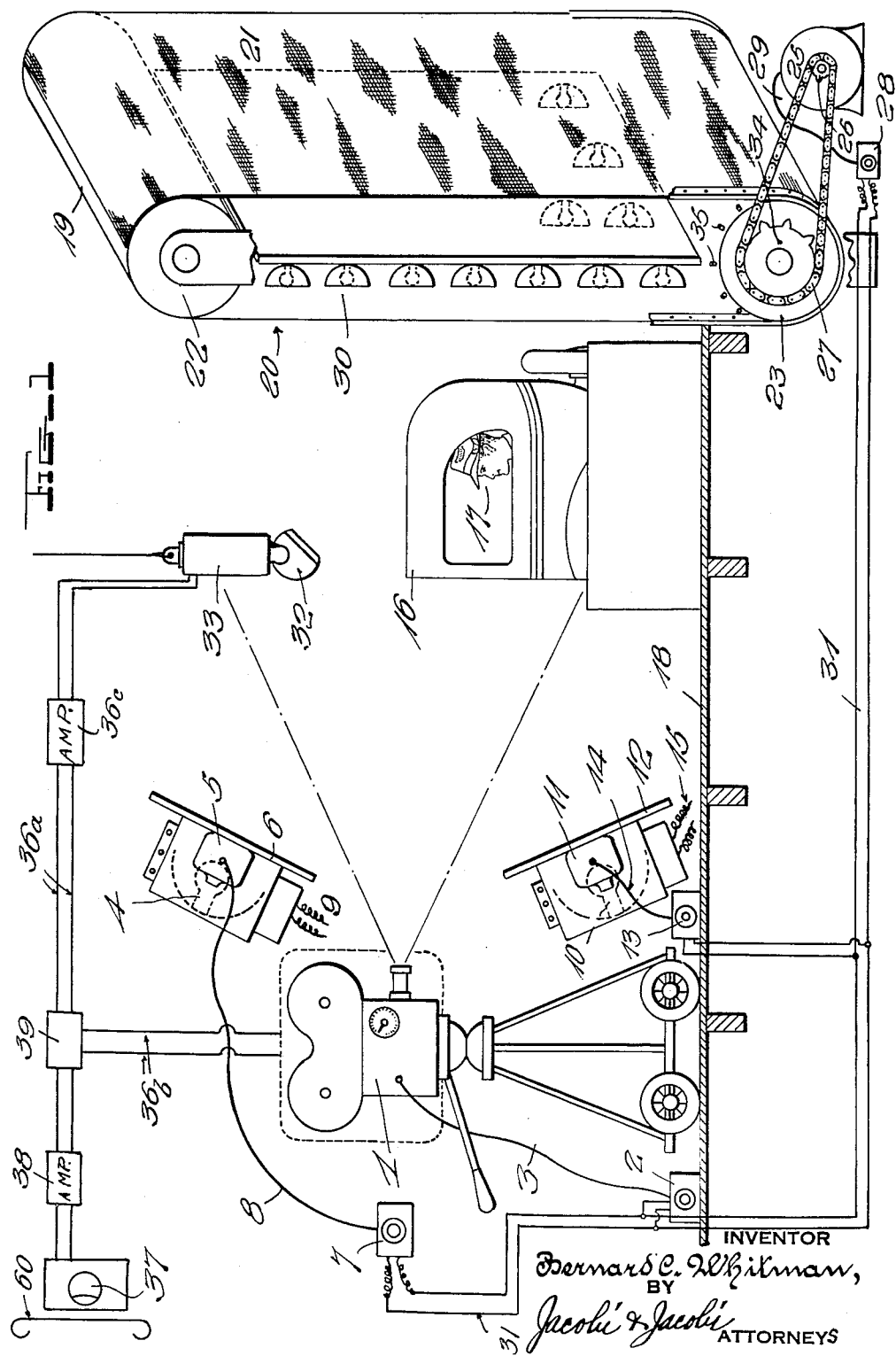
Figure 1 is an assembled view of the elements of my apparatus for making motion picture photographs and complementary silhouettes, showing the camera, the visual actions, the front lights, the revolving black and white back curtain and the back lights, and the synchronizing controls.

Referring to the drawings in detail, in Figure 1, 1 is a camera driven by a control drive 2 connected to camera 1 by a suitable control line 3. The camera 1 will ordinarily be a sound camera, in which case it will be sound proof. 4 and 10 are two suitable front lights positioned for illuminating the field of visual actions 16 from the side of the camera. Front light 4 is provided with a fast shutter 6 controlled by an actuating unit 5. Actuating unit 5 is connected to a synchronous control unit 7 by a control line 8. Units 6 and 7 may consist of a synchronous motor and known suitable mechanical drive mechanism. Energy is supplied to light 4 from a commercial source through terminals 9.

Similarly, front light 10 is provided with shutter 12 controlled by actuating unit 11. Actuating unit 11 is connected to a synchronous control unit 13 by a control line 14. Units 11 and 13 may also comprise a synchronous motor. Energy is supplied to light 10 through terminals 15.

The visual actions are generally designated by 16, here shown as consisting of the rear of a taxicab in which is an actor 17. My system is particularly adapted to the taking of motion pictures in which the visual actions involving movement occupy only a fractional part of the field of view of a frame, and in which the remainder of each frame can be filled with a considerable part of a desired background scene. As hereafter explained, it is necessary in taking the pictures with camera 1, to run the camera at twice the normal picture taking speed, since two separate frames are taken for each frame to be projected.

The camera, lights, and visual actions, are supported on a stage or platform 18.

19 is the continuously revolving two-piece background curtain, consisting of two equal pieces 20 and 21, joined together at both ends to form a continuous surface like an endless chain. The portion 20 is a white semi-transparent fabric such as sheeting or white canvas. The portion 21 is black velvet or other black material. 22 and 23 are rollers for carrying the curtain 19, and are provided with sprockets 35 which engage marginal guides of curtain 19. Roller 23 is provided with a sprocket 34 driven by a chain 27 connected to a sprocket 26 of synchronous motor 25. Motor 25 is controlled by control unit 28 through control line 29.

As shown, background curtain 19 is mounted back of the visual actions 16, on the side of 16 opposite the camera. Between the two sheets of curtain 19, and pointing past visual actions 16 toward camera 1, are mounted the bank of lights 30, which in the form here disclosed are lighted continuously.

The control units 2, 7, 13, and 28, of the camera, lights, and background curtain, are interconnected by synchronizing control line 31, which supplies a common electric control voltage to these control units, whereby these units operate in synchronism. The controls are so arranged that when the white sheet 20 is in front of lights 30, shutters 6 and 12 are closed shutting off lights 4 and 10, and when the black velvet 21 is in front of lights 30, the shutters 6 and 12 open and lights 4 and 10 illuminate the front of the visual actions 16 from the camera side.

A microphone 32 with its accessory apparatus 33 is positioned suitably above the stage, and is connected by a line 36a, 36b, to the sound recording apparatus of camera 1 through an amplifier 36c.

Figure 2:
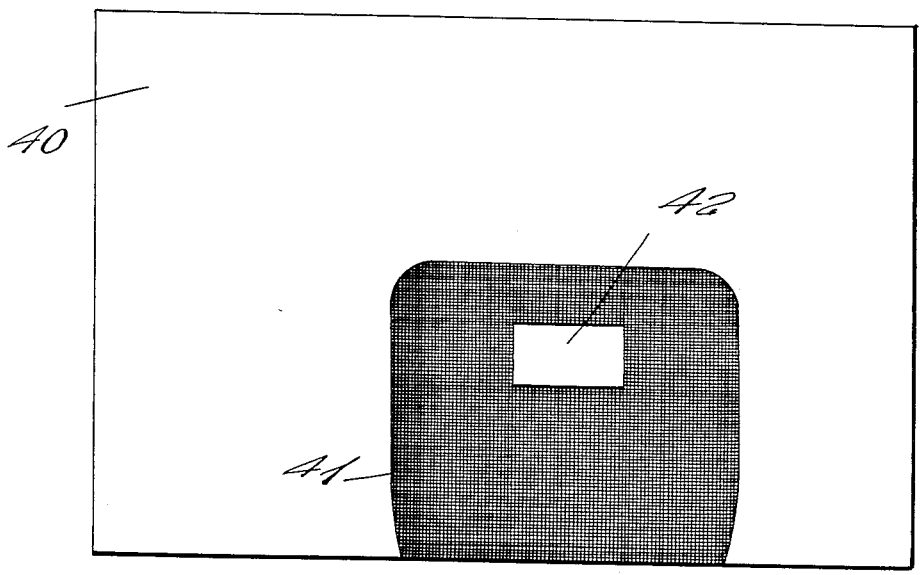
Figure 2 is a positive print of a frame of the silhouette of the visual actions, taken with background lighting.

When curtain 19 is in the position shown in Figure 1, with background lights 30 turned on and white sheet 20 in front of the lights 30 to produce a brilliant white background, and shutters 6 and 12 are caused to shut off front lights 4 and 10, if the shutter of camera 1 is opened by its synchronous control, there will be recorded a silhouette of the visual actions 16, as shown as a positive print in Figure 2. The outline of the part of the field of view occupied by the visual actions 16 will be recorded as shown in the dark area 41, in Figure 2, and the remainder of the field of view occupied only by the brilliant white sheet, will be recorded blank, as shown at 40 in Figure 2.

Figure 3:
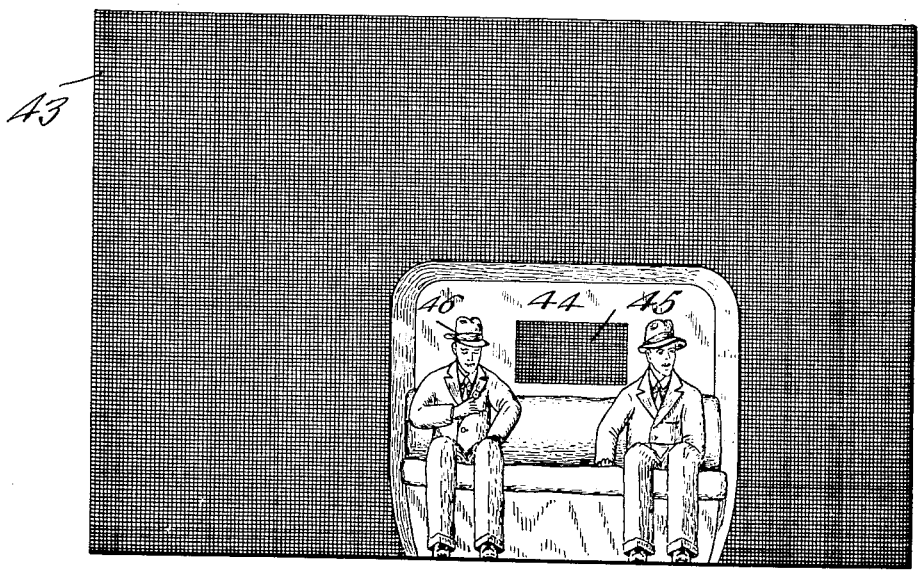
Figure 3 is a positive print of a frame of the visual actions, taken with a black background and front lighting.

When curtain 19 is rotated half of its cycle, so that the black valvet sheet 21 is in front of and shuts off lights 30, and shutters 6 and 12 are caused to expose front lights 4 and 10 by the synchronizing control units, if the shutter of camera 1 is opened by its synchronizing control, there will be recorded a normal photograph of the visual actions 16 with normal lighting, with a dead black background. This is shown as a positive print in Figure 3, where the portion 44 of the field of view is occupied by the visual actions 46, and its background area 45. Figure 2 occupies one frame of the film, and Figure 3, occupies the next frame. Because the frames of Figures 2 and 3 are taken only a fraction of a second apart, the silhouette of Figure 2 is rigorously complementary to the picture of Figure 3.

The sound unit of the camera should be so arranged as to record sound only when the picture frames are taken, and not when the silhouette frames are taken.

Figure 4:
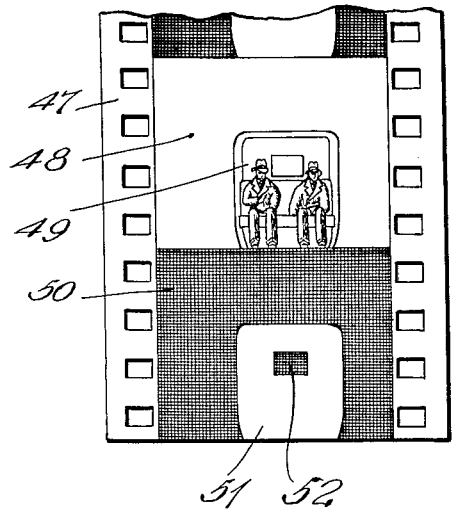
Figure 4 is a negative print of a film with two adjacent frames, one of the silhouette of the visual actions, and the other a normal take of the visual actions with black background.

A negative print of a film with a normal picture on black background, and its complementary silhouette, occupying adjacent frames of the film, is shown in Figure 4. 47 is the negative print of the film, 48 is the blank space on one frame occupied by the black background, and 49 is the picture of the visual actions. On the adjacent silhouette frame, 50 is the white background, and 51, is the silhouette of the visual actions with its background area 52.

Figure 5:
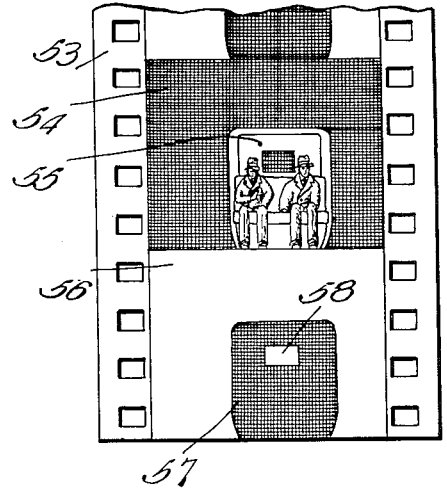
Figure 5 is a positive print of two frames made from the negative print shown in Figure 4, one being the silhouette of the visual actions, and the other a normal picture of the visual actions on black background.

By printing the negative of Figure 4 on to ordinary undeveloped film, there is obtained the positive print shown in Figure 5 of two adjacent frames. 54 is the black background and 55 the visual actions of the normal picture film, and 57, is the silhouette of the visual actions, taken in front of white background 56, with its background area 58.

Figure 6:
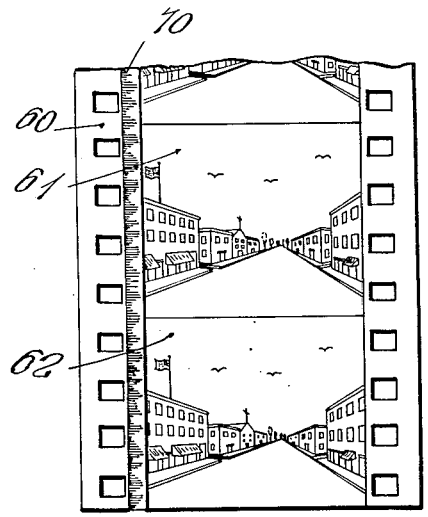
Figure 6 is a positive print of an ordinary film with sound track, of a desired background scene.

Figure 6 shows a normal positive print of an ordinary motion picture film of a desired background scene, here shown as a long straight street, 60 is the film, having adjacent picture frames 61, 62, and a sound track 70. Sound events corresponding to visual actions of the background scene may be recorded on this sound track 70, and converted into a corresponding electric current by a suitable photoelectric cell 37, amplified by an amplifier 38, and superimposed on the amplified output of microphone 32 in a suitable mixing unit 39.

Figure 7:
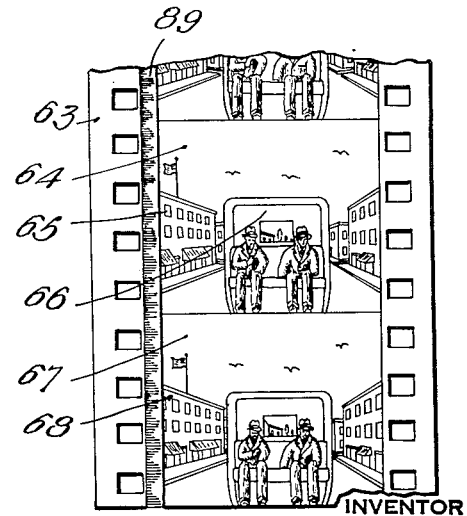
Figure 7 is a positive print of the final resultant composite film produced by my process, showing the visual actions inserted into the background scene.

Figure 7 is a positive print of the final resultant film produced by my process, showing the visual actions 16 inset into the picture of frame 61 of the background film. In Figure 7, 63 is the final positive film, having frames 64, 67, with background 65, 68, inset visual actions 66 and resultant sound track 89, being the composite of the recorded sounds corresponding to the background scene of Figure 6, and the sound actions impressed on microphone 32. The print shown in Figure 7 is really a "positive negative", from which is made the master negative for printing the finished positive prints for projection.

Figure 8 shows the printing frame arrangement for the step printing of the visual actions shown in Figure 5 into the background shown in Figure 6. 53 is the positive print with alternated frames of visual actions 55, and the complementary silhouette 57. 60 is the background film, and 75 is ordinary unexposed negative film having successive frames 76, 77. 80 is a printing light source having a condensing lens 81. 82 is a printing shutter having aperture 83. 84 is a printing frame. Films 60 and 75 are carried on suitable reels, which may be a common reel 86. Alternated film 53 is carried on a reel 87.

In the first printing position, the silhouette frame 56 of positive alternated film 53 is brought into register with printing frame 84, and at the same time, frame 62 of the background film 60 is brought into register with the printing frame 84, and frame 77 of unexposed negative film 75 is also brought into register. The printing shutter is then actuated to expose frame 77 to frames 56 and 62 superposed. This produces on frame 77 an image of background scene 62, with a blank space occupied by silhouette figure 57. It will be particularly noted that I use a positive background print and a positive print of the actions in printing my composite negative.

Figure 10 shows these arrangements of the images on the different positive films, with the undeveloped film 75 in front. By looking into a printer with the films arranged as shown in Figure 10, with a printing light to the right behind film 53, there can be seen on the frame 77 of undeveloped film 75, an image as shown at 77, 78, of the superposed frames 56, 62. This image is a positive image and is not the negative record which will appear on negative film 75 when developed.

Referring to Figure 11, which shows the second step of printing, after frames 62 and 56 have thus been recorded on frame 77 of undeveloped film 75, the alternated silhouette film 53 is pulled down one frame, so that silhouette frame 56 is out of register with printing frame 84, and the adjacent picture frame 54 of film 53 is brought into register with printing frame 84. The positions with reference to printing frame 84, of frame 62 of background film 60, and partly exposed frame 77 of undeveloped film 75, are not changed. The printing shutter 82 is then opened, and the visual actions 55 contained in frame 54 of film 53, are printed into the space 78 reserved therefor in the partly exposed frame 77 of film 75 shown in Figure 10. The black portion 54 of film 53 keeps the light from fogging the previously exposed record of the background scene. When developed, the composite picture will appear as a negative of the composite view shown at 79 in Figure 11, with the visual actions inset into the background.

Figure 12 shows the film frames in the position of Figure 10. Figure 13 shows the frames of films 60 and 75 undisturbed, but alternated film 53 pulled down one frame, as in Figure 11.

After picture frame 55 has been printed on to undeveloped frame 77, as above described, all three films are advanced one frame. This will produce the situation shown in Figure 14, it being understood that the lower frame of film 53 shown in Figure 13 has advanced one frame and is not shown.

The composite sound track recorded by the camera 1 can most conveniently be printed separately onto the composite picture film by a separate printing subsequent to the picture printing.

It will be understood that in printing, background film 60 and undeveloped film 75 are advanced at the normal film speed, but to produce a final composite film 63 to run at normal speed, the alternated film 53 carrying the silhouettes must be advanced at twice this rate, since one of its silhouettes and one of its normal pictures must both be recorded on one frame of film 75 which eventually becomes the final positive film 63 of Figure 7.

The background curtain must move the number of complete cycles a minute corresponding to the standard number of frames a minute. The black sheet must be exposed ninety times, and the white sheet ninety times a minute, on ordinary film, that is about 180 frames a minute. This means 180 movements of the rollers a minute.

In taking film 53 originally, it is, therefore, necessary also to run the film at twice normal speed.

After each frame of undeveloped film 75 has thus had two exposures, and the visual actions have been inset into each frame of film 75, this film is developed, forming a composite negative print of the visual actions and background. A positive print 63 which can be projected must then be made from this negative film 75, and will appear as shown in Figure 7.

The operation of my system will be obvious from the foregoing. The white sheet 20 is first brought in front of lights 30, brilliantly illuminating visual actions 16 from the back, while front lights 4 and 10 are shut off by their shutters. The shutter of camera 1 is then actuated and records on one frame of the camera film, a silhouette of visual actions 16. The interlocked synchronized control units connected by synchronizing line 31, then cause endless curtain 19 to rotate half a cycle and bring black velvet 21 in front of lights 30, open shutters 6 and 12 exposing front lights 4 and 10, and actuate the shutter of camera 1, which takes a normal picture of visual actions 16 with front lighting. The process is then repeated, by the synchronizing control, the white sheet again coming in front of lights 30 and front lights 4 and 10 being shut off. The step printing operation has been fully explained. The sound actions corresponding to visual actions 16 are superposed in recording by camera 1 on the sound record on the background film. The final positive film produced gives a perfect impression of the actors performing before the background scene of the background film.

My invention, therefore, avoids the necessity and expense of transporting actors to a distant background scene, and makes possible the employment of any desired background scene with actors performing in the studio.

While I have described one particular type of visual actions 16 for purposes of illustration, it will be realized that any desired type of visual actions can by my method be superposed on any desired recorded background, without in any way departing from the spirit of my invention.

From the foregoing description of the construction of my improved device, the operation thereof and the method of applying the same to use will be readily understood. It will be seen that I have provided a simple, inexpensive and efficient means for carrying out the objects of the invention and while I have particularly described the elements best adapted to perform the functions set forth, it is obvious that various changes in form, proportion and in the minor details of construction may be resorted to without departing from the spirit or sacrificing any of the principles of the invention.

Having thus described the invention what is claimed is:

1. In an apparatus for motion picture photography, a camera, a stage upon which visual actions are performed before said camera, a continuous two-piece curtain formed of two sheets joined together at both ends, one of said sheets being translucent and substantially white, the other of said sheets being opaque and substantially black, a pair of rollers over which said curtain runs, said rollers being so positioned that one of said sheets of said curtain at a time is presented at the back of said stage back of said visual actions with respect to said camera, control means for rotating said rollers in such manner as to present one of said sheets at a time at the back of said stage, and a background light mounted between the sheets of said curtain for projecting light through said translucent sheet when said translucent sheet is presented nearest said camera and illuminating said visual actions from behind.

2. In an apparatus for motion picture photography, a camera, a stage upon which visual actions are performed before said camera, a continuous two-piece curtain formed of two sheets joined together at both ends, one of said sheets being translucent and substantially white, the other of said sheets being opaque and substantially black, a pair of rollers over which said curtain runs, said rollers being so positioned that one of said sheets of said curtain at a time is presented at the back of said stage back of said visual actions with respect to said camera, background control means for rotating said rollers in such manner as to present one of said sheets at a time at the back of said stage, a background light mounted between the sheets of said curtain for projecting light through said translucent sheet when said translucent sheet is presented nearest said camera and illuminating said actions from behind, a controllable front light mounted at the front of said stage for illuminating said visual actions on said stage from the direction of said camera, and synchronous means for cooperatively successively actuating said background control means and said front light in such manner that said front light delivers light upon said visual actions when said opaque sheet is presented behind said visual actions, and said front light delivers no light upon said visual actions when said translucent sheet is presented behind said visual actions and said background light projects light through said translucent sheet upon said visual actions from behind.

3. In an apparatus for motion picture photography, a camera, a stage upon which visual actions are performed before said camera, a background light mounted at the back of said stage for projecting light toward said camera, a pair of flexible movable background screen elements joined together at both ends to form a continuous curtain, one of said elements being translucent and substantially white and the other of said elements being opaque and substantially black, means for movably supporting said screen elements forming said curtain and translating the same at the back of said stage across the field of view of said camera between said background light and said camera, and background control means for intermittently actuating said first mentioned means to alternately present said screen elements successively between said background light and said camera, said background light being mounted between said screen elements forming said curtain for projecting light therethrough and illuminating said visual actions from behind when said translucent element is presented.

4. In an apparatus for motion picture photography, a camera, a stage upon which visual actions are performed before said camera, a background light mounted at the back of said stage for projecting light toward said camera, a pair of flexible movable background screen elements joined together at both ends to form a continuous curtain, one of said elements being translucent and substantially white and the other of said elements being opaque and substantially black, means for movably supporting said screen elements forming said curtain and translating the same at the back of said stage across the field of view of said camera between said background light and said camera, background control means for intermittently actuating said first mentioned means to alternately present said screen elements successively between said background light and said camera, said background light being mounted between said screen elements forming said curtain for projecting light therethrough and illuminating said visual actions from behind when said translucent element is presented, a controllable front light mounted at the front of said stage for illuminating said visual actions on said stage from the direction of said camera, and interlocking synchronous means for cooperatively successively actuating said background control means and said front light in such manner that said front light delivers light upon said visual actions when said opaque element is presented behind said visual actions, and said front light delivers no light upon said visual actions when said translucent element is presented behind said visual actions and said background light projects light through said translucent element upon said visual actions from behind.

BERNARD C. WHITMAN.